United States Patent [19]

Richter

[11] 4,118,447

[45] Oct. 3, 1978

[54] AERATOR CONTAINING A BALLAST CHARGE

[75] Inventor: Rolf Richter, East Greenwich, R.I.

[73] Assignee: Xodar Corporation, Greenville, R.I.

[21] Appl. No.: 807,873

[22] Filed: Jun. 20, 1977

[51] Int. Cl.$^2$ ............................................... B01F 3/04
[52] U.S. Cl. ................................. 261/122; 210/221 P
[58] Field of Search ........... 261/120, 122, 124, 121 R, 261/123; 210/242 A, 221 P

[56] References Cited

U.S. PATENT DOCUMENTS

| | | | |
|---|---|---|---|
| 2,502,187 | 3/1950 | Wahlgren | 261/122 |
| 3,063,689 | 11/1962 | Coppock | 261/122X |
| 3,103,788 | 9/1963 | Gross | 261/124 X |
| 3,318,098 | 5/1967 | Hoddinott et al. | 261/124 X |
| 3,491,023 | 1/1970 | McCormick | 261/124 X |
| 3,644,231 | 2/1972 | Maruya et al. | 261/122 X |
| 3,785,629 | 1/1974 | McKinney | 261/122 |

FOREIGN PATENT DOCUMENTS 1,404,864  9/1975  United Kingdom ..................... 261/124

Primary Examiner—Richard L. Chiesa
Attorney, Agent, or Firm—Schiller & Pandiscio

[57] ABSTRACT

The present invention provides novel apparatus for aerating a body of liquid. The apparatus includes a diffuser shell in the form of a substantially tubular, elongate body of a relatively rigid, gas permeable material such as fine pore polyethylene. The diffuser is closed at one end by a first end cap and at the other end by a combination second end cap and gas inlet assembly. The latter is adapted for connection to a source of pressurized gas. Disposed within the hollow interior of the diffuser shell is an elongate housing for containing a suitable ballast. The diffuser shell and ballast housing are dimensioned so that there is an interspace between the external periphery of the ballast housing and the inside of the diffuser shell. The ballast housing is supported at one end by the first end cap, and at the other end by the second end cap and inlet assembly so as to maintain the interspace between the ballast housing and the diffuser shell. Conduit means are used to connect a source of pressurized gas to the inlet assembly.

10 Claims, 3 Drawing Figures

AERATOR CONTAINING A BALLAST CHARGE

This invention relates to the treatment of water, and more particularly to aeration of bodies of water to improve the quality of water through the addition of dissolved oxygen.

Artificial aeration has long been recognized as a simple means for introducing dissolved oxygen into aquatic systems partially or wholly depleted of oxygen. The prime objective of artificial aeration is to increase the dissolved oxygen content of an aqueous system for fishery and/or water management purposes.

Various systems for effecting aeration of aquatic systems, e.g. in pools or tanks, have been described in the art and are available commercially. Generally, such systems include a source of pressurized gas, a diffuser member and means connecting the source of pressurized gas to the diffuser member. The latter typically comprises a hollow enclosure shell having a plurality of relatively small orifices or releasing bubbles of gas into the aquatic system being treated. The diffuser generally is fixed to the bottom of the pool or tank or the diffuser may be weighed down by a ballast charge.

Aerating means heretofore available have not been wholly satisfactory for one or more reasons such as high installation and maintenance costs, low efficiency resulting in high input air requirements, long aeration cycles, excessive break-down of natural stratification and excessive turbulent mixing with resultant ecological interference. Careful and controlled aeration without breaking down of natural stratification and without excessive turbulent mixture of bodies of water is normally preferred so as to (1) preserve thermogradients which may be essential for some organisms and other water users; (2) prevent excessive evaporation during warm weather; (3) minimize algal productivity as a result of total mixing; and (4) enable aeration of only those parts of the water column which are actually depleted of dissolved oxygen.

It is thus a primary object of the present invention to provide novel apparatus for aerating bodies of water.

A more specific object is to provide novel apparatus for aerating water that is adapted to diffuse aerating gas in a manner that provides efficient oxygen transfer to the water and without excessively turbulently mixing the water.

Another specific object is to provide novel apparatus which is especially inexpensive to manufacture and to maintain.

The foregoing objects are achieved by an apparatus which essentially comprises an elongate, generally cylindrical diffuser for disposition at or near the bottom of the body of water to be aerated. The diffuser comprises a substantially tubular outer shell or barrel of an inert gas permeable material such as fine-pore polyethylene. Disposed within the shell is a hollow tube for holding a ballast material. The outer shell is internally dimensioned so as to provide a space between its inner surface and the hollow tube. The outer shell is closed at one end by a first end cap and at the other end by a second end cap and gas inlet assembly. The latter is adapted for connection to a source of pressurized gas. The hollow tube is maintained in spaced relation with the inner surface of the outer shell as a result of being supported at one end by the end cap and at the other end by the combination end cap and inlet assembly. Conduit means are used to connect the end cap and inlet assembly to a source of pressurized gas.

For a fuller understanding of the nature and objects of the present invention, reference should be had to the following detailed description taken in connection with the accompanying drawings wherein:

FIG. 3 is an end view of the diffuser of FIG. 1, disposed in a liquid, and showing how aeration is produced in liquid by the diffuser.

In the several drawings like numerals depict like parts.

Figure 1:
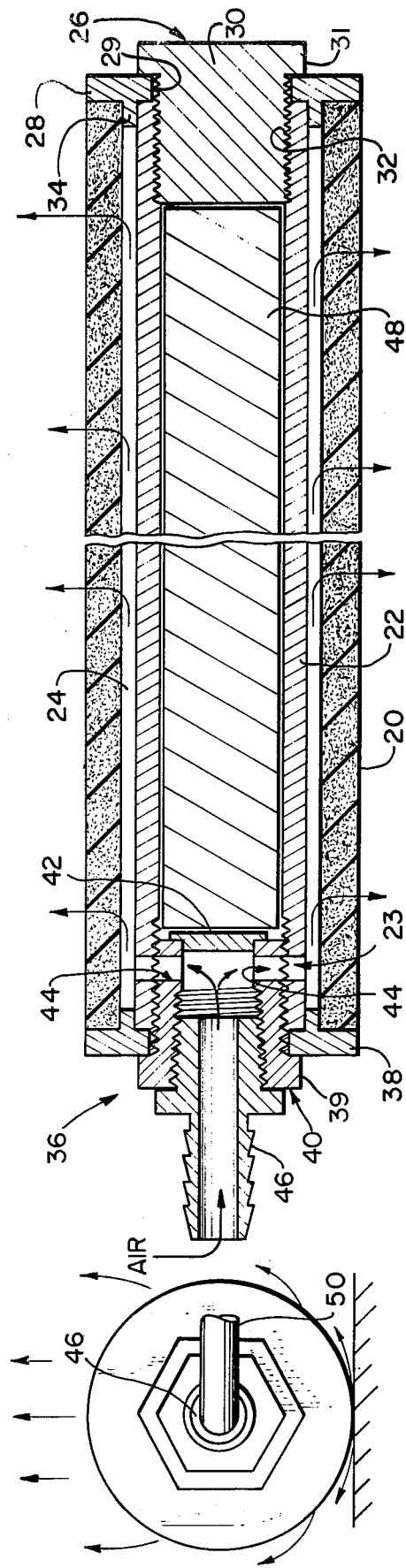
FIG. 1 is a longitudinal sectional view of a preferred embodiment of diffuser embodying the principles of the present invention.
Figure 2:
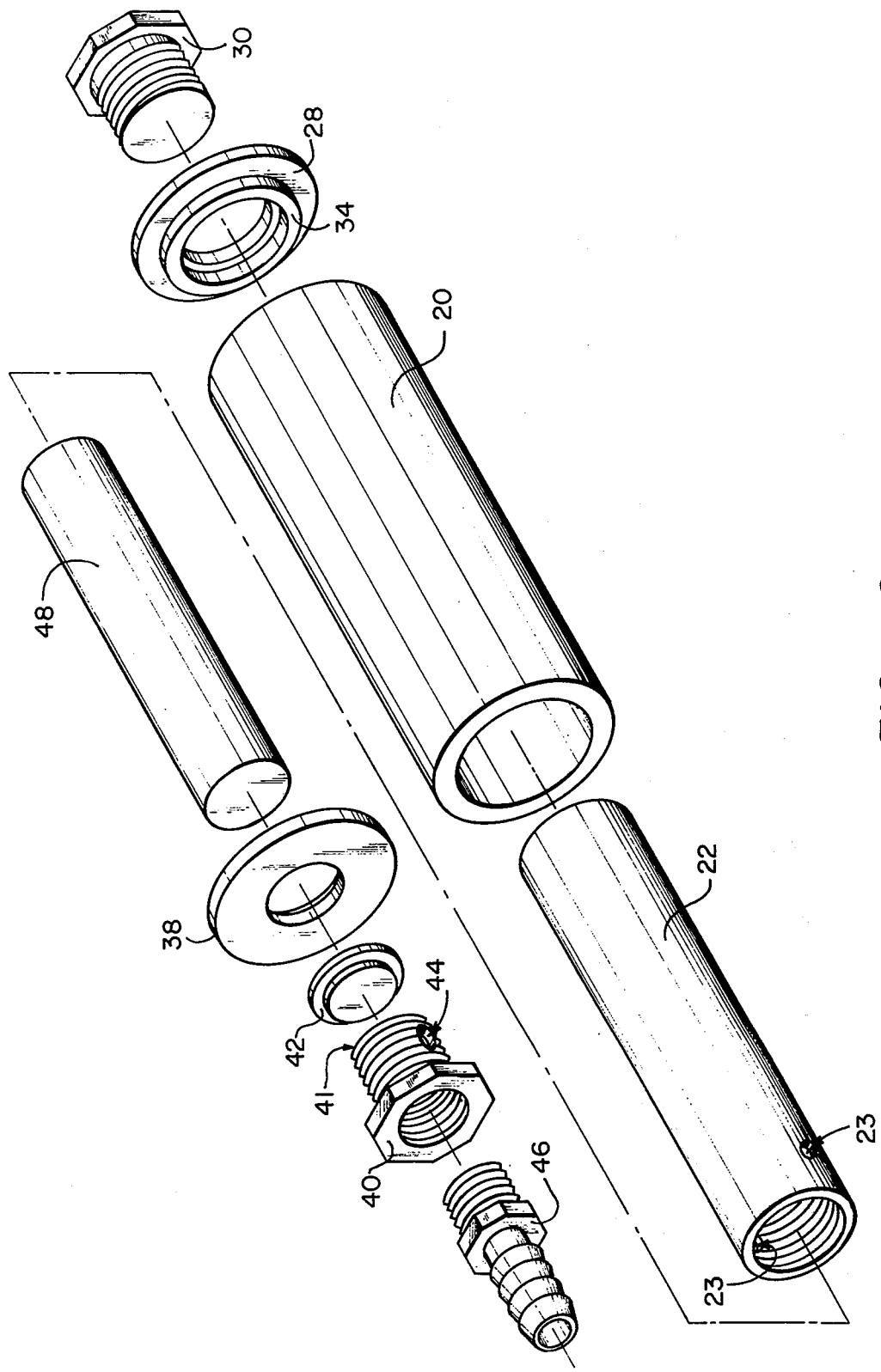
FIG. 2 is an exploded, perspective view of the diffuser of FIG. 1.

Referring to FIGS. 1 and 2, a diffuser in accordance with the present invention comprises an elongate, double-walled container formed of an outer shell 20 and inner tube 22. Preferably shell 20 and tube 22 are elongate hollow cylinders and are coaxial with one another, shell 20 being somewhat larger in internal diameter than the external diameter of tube 22, i.e. so that when the shell and tube are assembled together as shown in FIG. 1, there will be an annular interspace 24 between the shell 20 and tube 22.

Shell 20 is formed of a relatively rigid, gas (i.e. air or oxygen) permeable material such as fine-pore plastic material. A number of fine-pore plastic materials are known in the art and are available commercially. For example Glasrock, Porex Division (Fairburn, Ga.), offers a line of porous plastic molded tubes formed of polyethylene with pore sizes ranging from 10–500 microns which are useful for forming the diffuser shell 20 in accordance with the invention. Also available from this same manufacturer and suitable for use in the invention are tubes formed of polypropylene with pore size ranges of 125–500 microns, and 25 micron pore size polyvinylidene fluoride. Tube 22 can also be made from a porous plastic material; however, since tube 22 is not required to perform as a diffuser, tube 22 can be impervious to water and formed of a more economical plastic material, such as polyvinyl chloride water pipe. Preferably tube 22 is impervious to water so as to prevent dissolution of ballast material into the water being treated. One or more holes 23 are formed through the side wall of tube 22 adjacent one end of the tube. The purpose of holes 23 will become clear from the discussion following.

One end of shell 20 is closed by an end cap assembly indicated generally at 26. As seen in particular in FIG. 1, end cap assembly 26 also serves to close one end of tube 22 (i.e. the end opposite holes 23) and to support and maintain tube 22 in concentric spaced relation with the interior surface of shell 20. Referring also to FIG. 2, end cap assembly 26 comprises an end cap 28 and a threaded end plug 30. End cap 28 has a center aperture 29 to accommodate plug 30. The latter is threaded for mating with internal threads 32 formed at one end of tube 22 and has a flange 31 for engaging end cap 28. Formed integrally on the inside wall of end cap 28 and spaced from the threaded aperture is a cylindrical collar 34. The latter has a thickness substantially equal to the thickness of interspace 24.

The other end of shell 20 is closed by a combination end cap and inlet assembly indicated generally at 36. Assembly 36 includes a second end cap 38 identical to end cap 28. Mounted in end cap 38 and screwed into tube 22 is an internally and externally threaded hollow reducer 40 having a flange 39 for engaging end cap 38. Reducer 40 is closed at its inside end 41 by a plug 42 which is secured in place by suitable means, e.g. cement or a screw connection. One or more holes 44 are formed through the side wall of hollow reducer 40, adjacent the plugged end 41. Although not required, holes 44 preferably are substantially the same size as holes 23. Preferably holes 44 are spaced around reducer 40 so that when reducer 40 is mounted in tube 22, holes 23 in tube 22 and holes 44 in reducer 40 are substantially aligned with each other (see FIG. 1). Screwed into the open end of reducer 40 is a Nylon hose adapter 46 of conventional design.

Completing the diffuser is a ballast charge indicated generally at 48. The ballast charge can comprise a solid, e.g. a cast ingot of metal such as lead, or the ballast may comprise a relatively high density particular material such as gravel, metal shot, etc.

As is believed obvious screwing plug 30 and reducer 40 into the threaded end of tube 22 has the effect of forcing end caps 28 and 38 toward one another and thereby cause them to grip and hold shell 20 in spaced relation to tube 22.

The mode of operation of the apparatus will now be described with further reference to FIG. 3. Assume that the diffuser is positioned on its side on the bottom of a water holder. The diffuser is held on the bottom of the water holder by the ballast charge. Air is then introduced to the diffuser via an inlet hole 50 attached at one end to a source of pressurized air (not shown) and attached at the other end to adapter 46. The air under pressure flows through adapter 46 and aligned holes 44 and 23 so as to fill interspace 24. Almost immediately after the interspace begins to receive air, the internal pressure throughout interspace 24 equalizes, and air begins to escape from the diffuser via the pores in shell 20. The flow of pressurized air into the diffuser is then adjusted to a desired value.

The above described diffuser made in accordance with the present invention has a number of advantages over the prior art diffusers. For one the diffuser can be formed from relatively inexpensive, commercially available materials. Another advantage is that the diffuser is substantially omni-directional through a full 360° about its elongate axis. Thus a diffuser made in accordance with the present invention is position insensitive. Accordingly, the diffuser can simply be dropped into the pool of water to be aerated, and regardless of the orientation the diffuser may assume at the bottom, substantialy full delivery of air can be expected. Moreover, tests have shown that on the basis of efficiency and oxygenation capacity, a cylindrical diffuser made in accordance with the present invention is superior to standard prior art box type diffuser under similar gas charge flow rates, and produces less turbulence. Another important advantage of the invention is that the aerating device constructed in accordance with the invention does not need to be secured to the bottom of the liquid holder. Therefore it is a relatively simple matter to retrieve the aerater, e.g. as by pulling the aerater to the surface for inspection and repair. Moreover, repair of the diffuser, e.g. to replace a clogged diffuser shell 20 can be readily and inexpensively accomplished.

Another advantage is that the invention may be modified, e.g. by replacing one shell 20 of a given porosity with another shell of different porosity, or making the several parts of different materials. Also the ballast could be made an integral, i.e. fixed, part of tube 22. It also is possible to use tubes 20 and 22 which have a non-circular cross-sectional shape, e.g. a hexagonal tube. It is also contemplated that a plurality of diffusers in accordance with the present invention may be employed together in a body of water. Thus, it is possible to connect a plurality of diffusers made in accordance with the foregoing description through a distribution box to a common source of pressurized gas. It is also contemplated that the shell 20 may be made of some other porous material, as for example, a porous ceramic or a porous metal.

Still other modifications will be obvious to persons skilled in the art which are characterized by the advantages hereinabove discussed.

What is claimed is:

1. An aeration diffuser, comprising in combination: an elongate, substantially tubular and stiff outer member formed of a gas permeable material, and a tubular inner member containing a ballast charge for holding the diffuser submerged in a pool of water, said inner member being disposed within said outer member and spaced from the surrounding wall of said outer member;
    a first end cap closing one end of said outer member and mechanically supporting one end of said inner member in spaced relation with said outer member; and
    a combination second end cap and inlet assembly closing the other end of said outer member and mechanically supporting the other end of said inner member in spaced relation with said outer member; said end cap and inlet assembly being adapted for connection to a source of compressed air.

2. An aeration diffuser according to claim 1 wherein said inner member is a substantially cylindrical tube, and further including a plug member disposed within and closing off said one end of said inner member.

3. An aeration diffuser according to claim 2 wherein said outer member is a substantially cylindrical tube.

4. An aeration diffuser according to claim 2 wherein said first and said second end caps each have a collar formed integrally on an inside wall thereof, said collars extending between said inner member and said outer member and serving as spacers to maintain said members in concentric spaced relation to each other.

5. An aeration diffuser according to claim 1 wherein said combination second end cap and inlet assembly comprises a bushing mounted within said other end of said inner member, and further including at least one hole in a side wall of said inner member for transmitting air from the interior of said bushing to the space between said outer and inner members.

6. An aeration diffuser according to claim 1 wherein said outer member is made of a fine-pore plastic material.

7. An aeration diffuser according to claim 6 wherein said fine-pore plastic material is selected from the group consisting of porous polyethylene, porous polypropylene and porous polyvinylidene fluoride, and further wherein the pores of said fine-pore plastic material range in size from 10-500 microns.

8. An aeration diffuser according to claim 1 further including a solid ballast member disposed within said inner member.

9. An aeration diffuser comprising in combination:
    an elongate substantially tubular and relatively stiff outer shell formed of a gas permeable material;

an elongate hollow inner member disposed within and spaced from the outer shell, at least the opposite ends of said inner member being tubular, said inner member containing a ballast charge for holding the diffuser submerged in a pool of water;

first and second annular end caps disposed at opposite ends of said outer shell and having means for supporting the opposite ends of said inner member in radial spaced relation to said outer shell;

a plug extending into and closing off one end of said inner member and having means for retaining one of said end caps fixed with respect to said shell and inner member;

an inlet assembly comprising a bushing extending into and affixed to the opposite end of said inner member and means on said bushing for retaining the other of said end caps fixed with respect to said shell and inner member; and at least one passageway in said inner member for passing air or oxygen admitted via said bushing to the space between said shell and said inner member.

10. An aeration diffuser according to claim 9 wherein said plug and said bushing are connected to said inner member by a threaded connection.

* * * * *